No. 794,173. PATENTED JULY 11, 1905.
E. FÜLLNER.
DRUM FILTER.
APPLICATION FILED JAN. 13, 1905.

3 SHEETS—SHEET 1.

Witnesses.
Juliette Lutz
John Lotka

Inventor
Eugen Füllner
By Briesen & Knauth
his Attorneys.

No. 794,173. PATENTED JULY 11, 1905.
E. FÜLLNER.
DRUM FILTER.
APPLICATION FILED JAN. 13, 1905.

3 SHEETS—SHEET 2.

Witnesses.
John Lotka

Inventor
Eugen Füllner
By Briesen & Knauth
his Attorneys

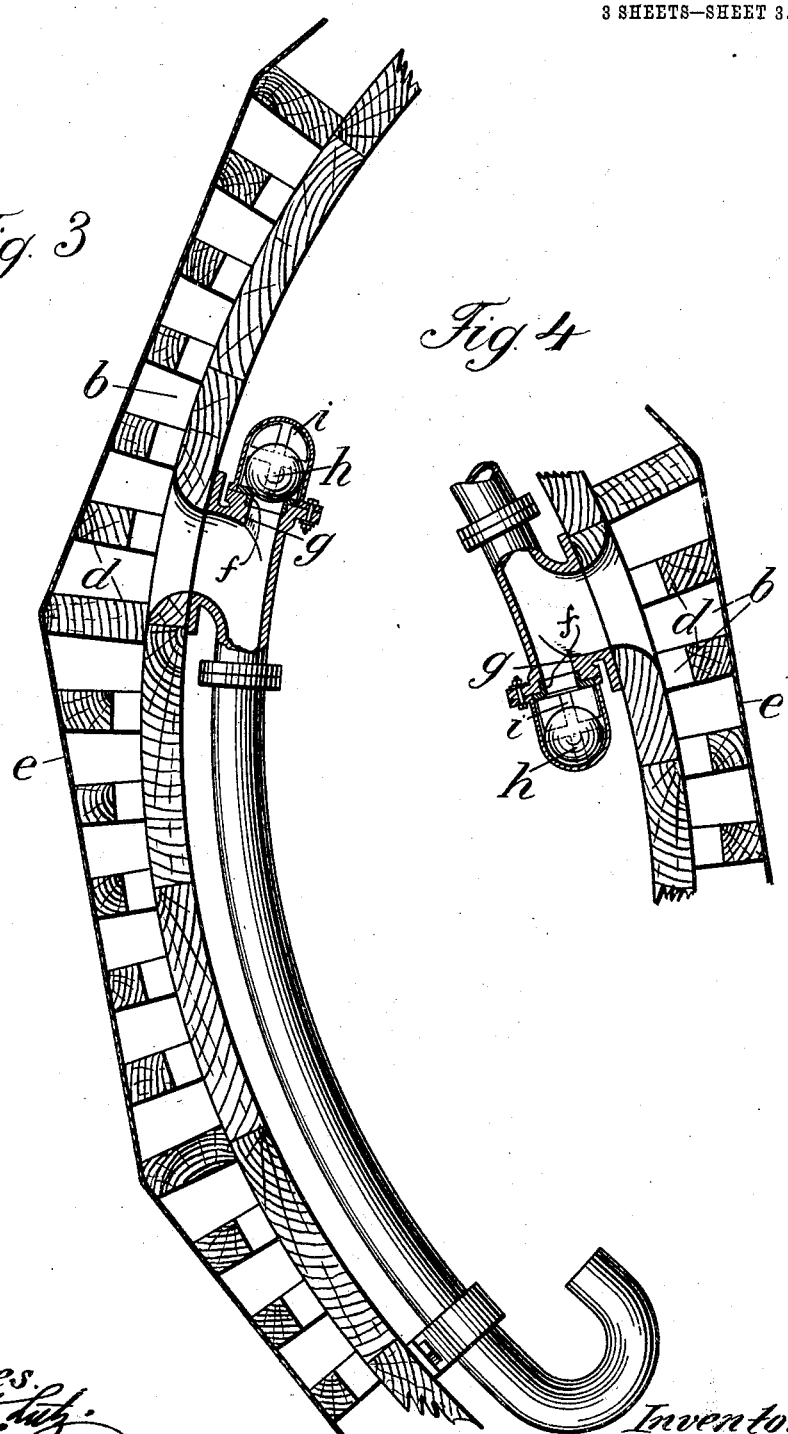

No. 794,173.

Patented July 11, 1905.

UNITED STATES PATENT OFFICE.

EUGEN FÜLLNER, OF HERISIHDORF, NEAR WARMBRUNN, GERMANY.

DRUM-FILTER.

SPECIFICATION forming part of Letters Patent No. 794,173, dated July 11, 1905.

Application filed January 13, 1905. Serial No. 240,875.

*To all whom it may concern:*

Be it known that I, EUGEN FÜLLNER, manufacturer, a subject of the German Emperor, residing at Herisihdorf, near Warmbrunn, Silesia, in the Empire of Germany, have invented new and useful Improvements in Drum-Filters for Purifying the Waste Water in Paper-Manufactories, of which the following is a specification.

The present invention relates to such drum-filters as have casings formed of separate cells each of which is provided with a discharge-pipe. In order to be able to use such drum-filters in a profitable manner for the filtration of the waste water of paper-manufactories, which water is mixed with fibrous materials, according to the present invention the outlet of each discharge-pipe is arranged within the drum at a point which lies at such a distance behind the cell appertaining thereto that during the rising of the separate cells from a suitable point onward a suction action is exerted automatically on the layer on the cover of the cells by the filtered contents of the cells, which flow away in an unbroken jet. The result of this suction action is that the deposits forming the layer on the cover of the cells is prevented before being removed from being washed away during the rising of the cells, which is connected with a continual decrease of the filtering pressure.

The invention, moreover, consists of an arrangement which while the described action is maintained renders it possible on the descent of the cells for the liquid penetrating into the tubes to pass immediately to the outlet, and thus no counter-pressure is formed which prejudices the complete utilization of the hydrostatic pressure-head for the filtering action.

The drawings illustrate the present drum-filter in one form in which the drum is formed as a polygon and in which an endless filtering fabric is utilized as the filtering member.

Figure 1:
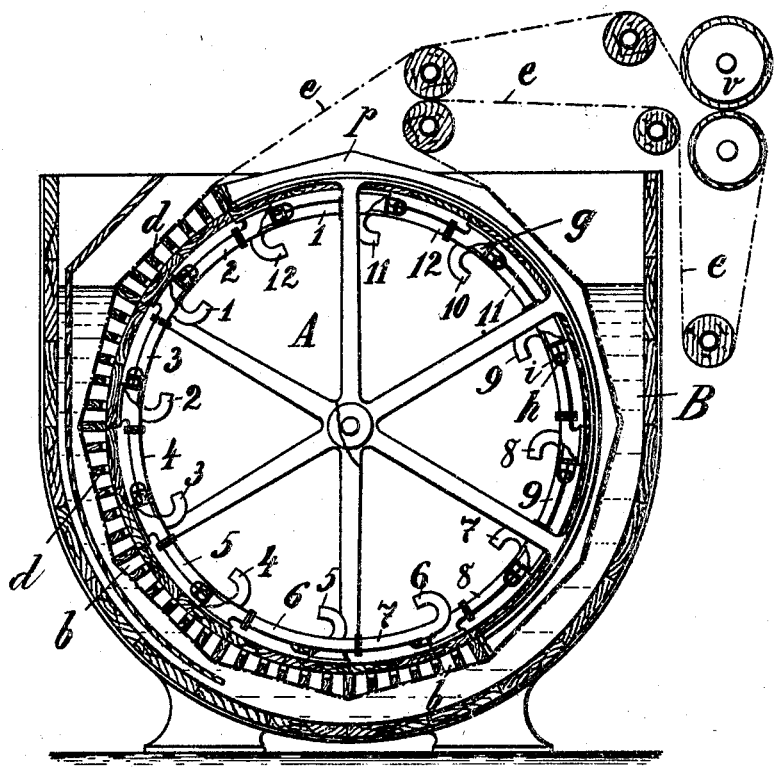
Figure 2:
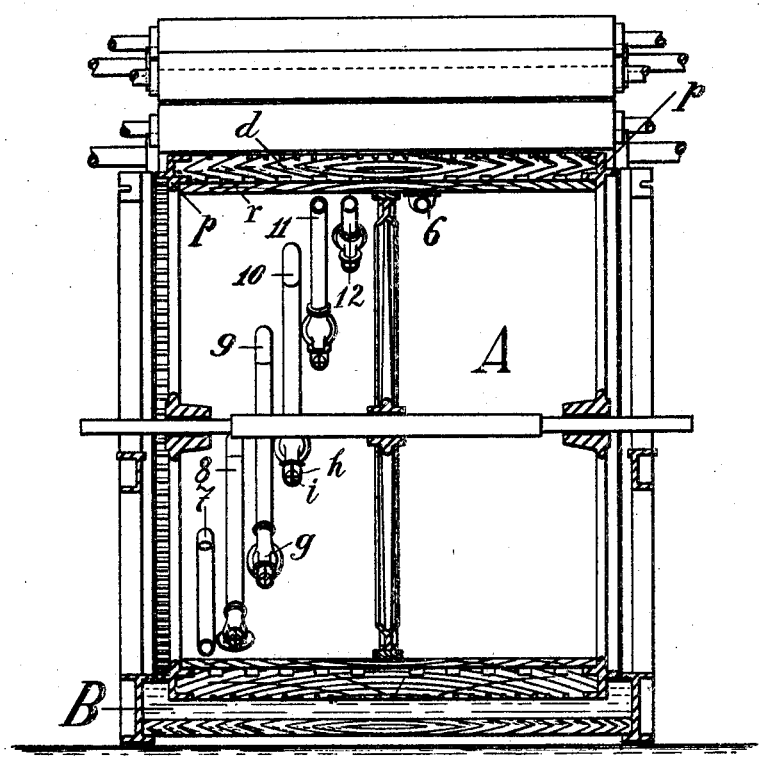

In said drawings, Figure 1 shows the drum-filter with the holder in section and with the drum partly in section. Fig. 2 is a cross-section through Fig. 1. Fig. 3 illustrates a piece of the drum with one cell-tube to an enlarged scale. Fig. 4 is a similar detail view.

The filter consists in a well-known manner of the holder B and of the drum A, which is adapted to revolve in said holder and which in the case represented is open at both ends. In cross-section it has the form of a dodecagonal polygon.

The drum-casing is formed of bars $d$, lying close to one another. The bars situated at the corners of the drum simultaneously form the side walls of the drum-cells $b$, each of which extends the length of one polygon side. The boards $r$, arranged under the bars between the end frame $p$ of the drum, form the bottom of the cells. At the part of the cells which lies in the deepest position on the ascent of the drum the tubes 1 2 3 4 5 6 7 8 9 10 11 12 are arranged and are led past several cells, so that the outlet end of each tube lies behind the inlet end by a suitable amount. The free end of each tube is suitably bent backward in the form of an arc. The tubes are uniformly distributed over the whole length of the drum. Each of the tubes 1 2 3 to 12 is provided at its upper mouth end with a connecting-piece $g$, in which, as is evident from Figs. 3 and 4, the valve-seat $f$ of a ball-valve is arranged. The ball $h$, forming the valve-body, is inclosed with sufficient room for play in a basket $i$, which is fastened on the connecting-piece $g$. In the case represented an endless filtering fabric $e$ is stretched round the drum as a closure for the cells $b$, said filtering fabric being led in a well-known manner to a pressing-roller $v$ or any other suitable delivery device. The closure of the cells could also be formed by a fine sieve or the like. The holder B is fed in a well-known manner with the liquid to be filtered.

When the drum rotates, the filtering process proceeds in the following manner: As soon as each of the tubes 1, 2, 3, to 12 has during the rotation of the drum passed the highest position, with its end situated on the bottom of the cell, the ball of the valve falls down automatically from its seat and the valve is opened, as is shown in Fig. 4. An outlet to the interior of the drum is consequently now produced through the open valve in the immediate neighborhood of the bottom of the cell. When a cell dips into the liquid, the latter in consequence of the external hydrostatic excess of pressure is forced into the cell through the filtering member stretched round the drum, and from the cell it passes through the connecting-piece $g$, the ball-valve being open to the outlet without being able to rise in the tube. As the pressure driving the liquid through the filtering member continually increases with the descent of the cell, whereas a counter-pressure cannot arise, the liquid is continually pressed through the filtering member with a pressure corresponding to the hydrostatic pressure-head at the time, and the matter held in suspension hereby separated is held firmly on the endless filtering fabric or sieve in such a way that the falling off of the same is avoided. As soon as a cell is in the act of rising and the outlet of the tube appertaining thereto takes up a position deeper than its inlet the ball $h$ of the valve rolls back again onto its seat, (see Fig. 3,) this taking place at the instant in which the weight of the ball is able to overcome the water-pressure. The connecting-piece $g$ is consequently closed. The water forced into the cell in consequence of the hydrostatic excess of pressure now passes through the tube appertaining thereto to the discharge-opening and begins to exert a suction action on the contents of the cell. This suction action increases according as the cell or the inlet of its tube rises above the outlet, and the layer deposited already on the filtering member renders it difficult for the water to pass through. In consequence of this circumstance the suction action is most powerful just where the hydrostatic pressure of the outer liquid has sunk to its lowest value. By this means not only is an increased separation of admixtures obtained on the rising part of the drum, but a washing away of the deposited layer during the rising of the cells out of the liquid to be filtered is prevented, which otherwise might take place on account of the slight filtering pressure. It is obvious that the volume of each cell, as well as its filtering-surface, must be in such a proportion to the internal diameter of the tube appertaining thereto that the filtered liquid flows away through the tube in the form of an unbroken or complete jet when the drum rises. As soon as the cell has left the liquid, whereby consequently no more liquid flows into the cell, the contents present in the cell flow away through the tube appertaining thereto until the column of liquid standing in the curved shank is able to hold in equilibrium the column of liquid in the pipe itself. This discharge of water taking place after the cell has left the liquid naturally exercises a suction action on the layer on the covers of the cells and brings about a drying of its mass, which facilitates the removal of the same in a compact form. The curved back end of the tube or the water-lock formed hereby prevents air penetrating from below into the tube, so that the full height of the water column present in the tube is rendered useful for the suction action. The present device has as a result an altogether favorable output for the drum-filter, as the full utilization of the hydrostatic pressure for the filtration takes place on the descending half of the drum.

What I claim as my invention, and desire to secure by Letters Patent, is—

1. In apparatus for the purification of the waste water of paper-manufactories, the combination of a holder containing the waste water, a drum revolubly mounted in said holder, a plurality of cells arranged on the circumference of said drum, a filtering member covering said cells, means for removing deposits from said filtering member, and a separate discharge-tube for each cell, each discharge-tube having an inlet in communication with its respective cell and an outlet at its other end in the interior of the drum, said outlet being displaced away from the cell in question in the direction opposite to that of the rotation of the drum, substantially as and for the purpose set forth.

2. In apparatus for the purification of the waste water of paper-manufactories, the combination of a holder containing the waste water, a drum revolubly mounted in said holder, a plurality of cells arranged on the circumference of said drum, a filtering member covering said cells, means for removing deposits from said filtering member, a separate discharge-tube for each cell, a junction-piece connecting said tube with its respective cell, said junction-piece being provided with a special outlet, means for opening said special outlet on the descent of the cell and for closing the same on the ascent of the cell, each discharge-tube having an inlet in communication with its respective cell and an outlet at its other end in the interior of the drum, said outlet being displaced away from the cell in question in the direction opposite to that of the rotation of the drum, substantially as and for the purpose set forth.

3. In apparatus for the purification of the waste water of paper-manufactories, the combination of a holder containing the waste water, a drum revolubly mounted in said holder, a plurality of cells arranged on the circumference of said drum, a filtering member covering said cells, means for removing deposits from said filtering member, a separate discharge-tube for each cell, each discharge-tube having an inlet in communication with its respective cell and an outlet at its other end in the interior of the drum, said outlet being displaced away from the cell in question in the direction opposite to that of the rotation of the drum, and a special outlet in close proximity to the inlet, and means opening said special outlet on the descent of the cell and closing the same on the ascent of the cell, substantially as and for the purpose set forth.

4. In apparatus for the purification of the waste water of paper-manufactories, the combination of a holder containing the waste water, a drum revolubly mounted in said holder, a plurality of cells arranged on the circumference of said drum, a filtering member covering said cells, means for removing deposits from said filtering member, each separate discharge-tube having an inlet in communication with its respective cell and an outlet at its other end in the interior of the drum, said outlet being displaced away from the cell in question in the direction opposite to that of the rotation of the drum, and a special outlet in close proximity to the inlet, and a valve-seat and valve for controlling said outlet, the valve being adapted on the descent of the cell to fall from its seat and open the outlet and on the ascent of the cell to drop onto its seat and close the outlet, substantially as and for the purpose set forth.

5. In apparatus for the purification of the waste water of paper-manufactories, the combination of a holder containing the waste water, a drum revolubly mounted in said holder, a plurality of cells arranged on the circumference of said drum, a filtering member covering said cells, means for removing deposits from said filtering member, and a separate discharge-tube for each cell, each discharge-tube having an inlet in communication with its respective cell and an outlet at its other end in the interior of the drum, said outlet being displaced away from the cell in question in the direction opposite to that of the rotation of the drum, and the outlet end of each discharge-tube being curved backward with regard to the main portion of the tube in the direction of the rotation of the drum, whereby a water-lock is formed in said outlet end during the rising of the tube, substantially as and for the purpose set forth.

6. In apparatus for the purification of the waste water of paper-manufactories, the combination of a holder containing the waste water, a drum revolubly mounted in said holder, a plurality of cells arranged on the circumference of said drum, a filtering member covering said cells, means for removing deposits from said filtering member, each separate discharge-tube having an inlet in communication with its respective cell and an outlet at its other end in the interior of the drum, said outlet being displaced away from the cell in question in the direction opposite to that of the rotation of the drum, and also having a special outlet in close proximity to the inlet, and a valve-seat and valve for controlling said outlet, the valve being adapted on the descent of the cell to fall from its seat and open the outlet and on the ascent of the cell to drop onto its seat and close the outlet, and the outlet end of each discharge-tube being curved backward with regard to the main portion of the tube in the direction of the rotation of the drum, whereby a water-lock is formed in said outlet end during the rising of the tube, substantially as and for the purpose set forth.

In testimony whereof I have signed my name to this specification in the presence of two subscribing witnesses.

EUGEN FÜLLNER.

Witnesses:
 HENRY HASPER,
 WOLDEMAR HAUPT.